United States Patent [19]

Schuh

[11] Patent Number: 5,460,205

[45] Date of Patent: Oct. 24, 1995

[54] FIELD INSTALLABLE CHOKE TUBE

[75] Inventor: David N. Schuh, Calgary, Canada

[73] Assignee: Beta Machinery Analysis Ltd., Calgary, Canada

[21] Appl. No.: 835,342

[22] Filed: Feb. 14, 1992

[51] Int. Cl.[6] .................................................. F16L 55/04
[52] U.S. Cl. .............................. 138/40; 138/44; 138/26; 138/108
[58] Field of Search ........................ 138/40–46, 108, 138/26, 37

[56] References Cited

U.S. PATENT DOCUMENTS

| | | | |
|---|---|---|---|
| 4,129,324 | 12/1978 | Jones, Jr. ............................. | 138/40 |
| 4,231,230 | 11/1980 | Gratzer et al. ....................... | 138/26 |
| 4,570,745 | 2/1986 | Sparks et al. ........................ | 138/26 |
| 4,576,204 | 3/1986 | Smallhorn et al. ................... | 138/40 |
| 4,679,597 | 7/1987 | Stein .................................... | 138/26 |
| 4,690,245 | 9/1987 | Gregorich et al. ................... | 138/40 |
| 4,838,299 | 6/1989 | Behrens ............................... | 138/26 |
| 5,172,729 | 12/1992 | Vantellini ............................ | 138/26 |

*Primary Examiner*—David A. Scherbel
*Assistant Examiner*—Patrick Brinson
*Attorney, Agent, or Firm*—John Russell Uren

[57] ABSTRACT

A field installable choke tube apparatus and a method for installing the choke tube into a pulsation dampener of a compressor. The choke tube is insertable into the pulsation dampener through the opening between the nozzle and the pulsation dampener with a plurality of support arms in a retracted position. The support arms are extended after insertion of the choke tube to maintain the choke tube in a secure and predetermined position within the dampener.

10 Claims, 4 Drawing Sheets

5,460,205

FIELD INSTALLABLE CHOKE TUBE

This invention relates to a choke tube installation for a compressor and, more particularly, to a choke tube which will facilitate its installation into a compressor on site in the field.

BACKGROUND OF THE INVENTION

Pulsation dampeners are ordinarily used in field operations to allow compressors to run quieter and with less vibration. Such pulsation dampeners ordinarily consist of a bottle with a choke tube installed therein. The installation of such choke tubes, however, is normally achieved by removing the bottles from the compressor located in the field and installing the desired choke tube in a shop or other workplace where the bottles may be disassembled so as to allow the installation of the choke tube.

Such installation, however, can result in major compressor down time while the choke tube is being installed in the bottle and, further, the cost of removing and transporting the bottle to the remote location together with the necessary disassembly and reassembly at such location can be significant and inconvenient.

SUMMARY OF THE INVENTION

According to one aspect of the invention, there is provided a method of installing a choke tube on a pulsation dampener comprising the steps of inserting a choke tube and choke tube supporting apparatus through the nozzle of said pulsation dampener, connecting said choke tube to said nozzle, and supporting said choke tube within said pulsation dampener.

According to a further aspect of the invention, there is provided a choke tube apparatus for reducing the pulsation of a compressor comprising a choke tube, means to attach said choke tube to the nozzle of a pulsation dampener within the interior of said pulsation dampener, means for supporting said choke tube within said pulsation dampener and means to allow insertion of said choke tube into the interior of a pulsation dampener through said nozzle.

BRIEF DESCRIPTION OF THE SEVERAL VIEWS OF THE DRAWINGS

An embodiment of the invention will now be described, by way of example only, with the use of drawings in which.

DESCRIPTION OF SPECIFIC EMBODIMENT

Figure 1:
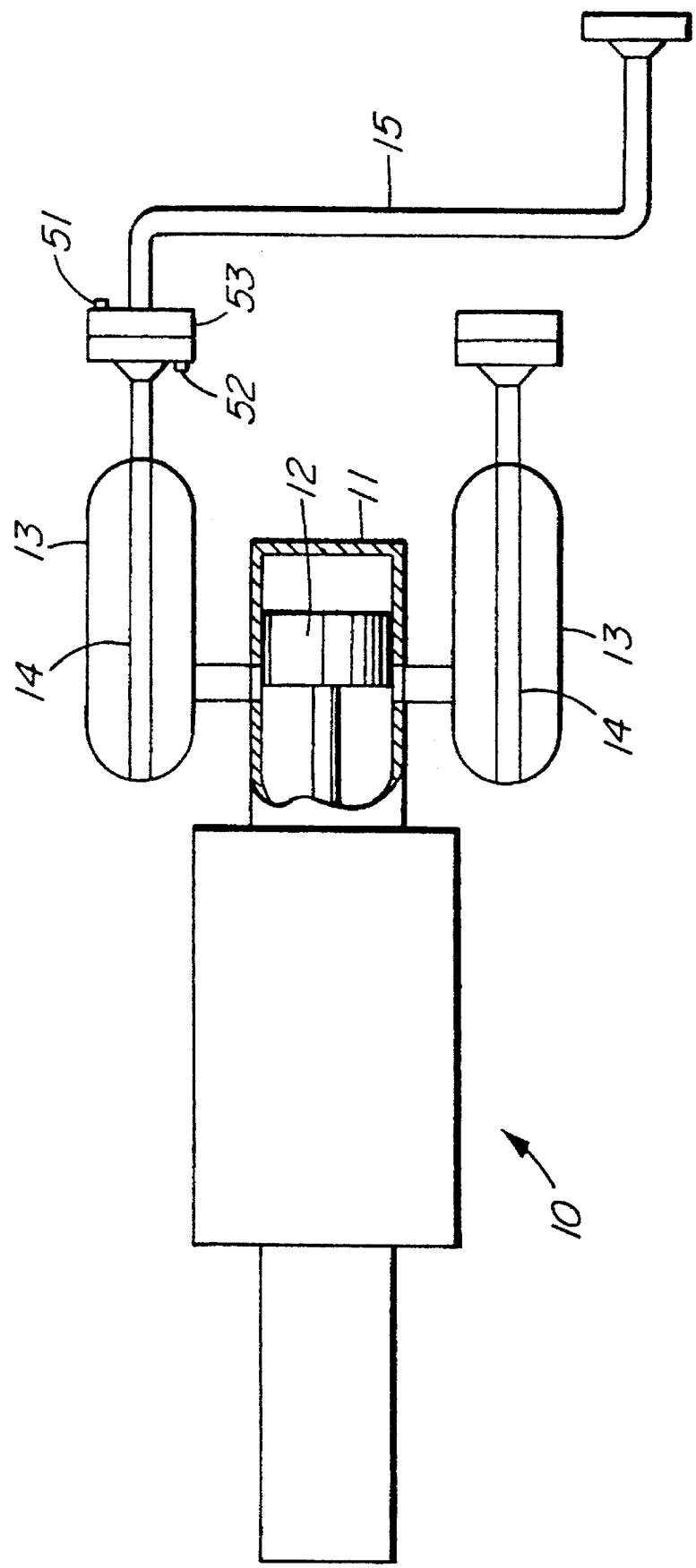
FIG. 1 is a diagrammatic side view of a compressor with respective pulsation dampeners attached, each pulsation dampener having a choke tube illustrated diagrammatically therein.

Referring now to the drawings, a compressor is illustrated generally at 10 in FIG. 1. It comprises a cylinder 11 with a piston 12 reciprocally movable therein.

Two pulsation dampeners or "bottles" 13 are typically mounted on opposite sides of the cylinder 11. To provide adjustment to the effectiveness of the pulsation dampeners 13, a choke tube generally illustrated at 14 is mounted within each pulsation dampener 13. Each such choke tube 14 has a predetermined diameter and is mounted at a predetermined location within the pulsation dampener 13, the diameter and the location depending upon the desired acoustical adjustment intended with such installation, the former factor usually being the most important.

In existing practise, the pulsation dampeners 13 may or may not have choke tubes 14 mounted therein. In any event, if it is intended to mount a choke tube 14 therein or to change the position of the choke tube 14 within the pulsation dampener 13, it is necessary to remove the pulsation dampener 13 from the suction pipe 15 and subsequently move it to a remote location, disassemble the dampener 13 and install or adjust the choke tube 14 to the predetermined most desirable location. Typically, the choke tube 14 is positioned by welding it to a flange (not shown) which is then attached to the bottle 13 in its desired location also by welding.

Figure 2A:
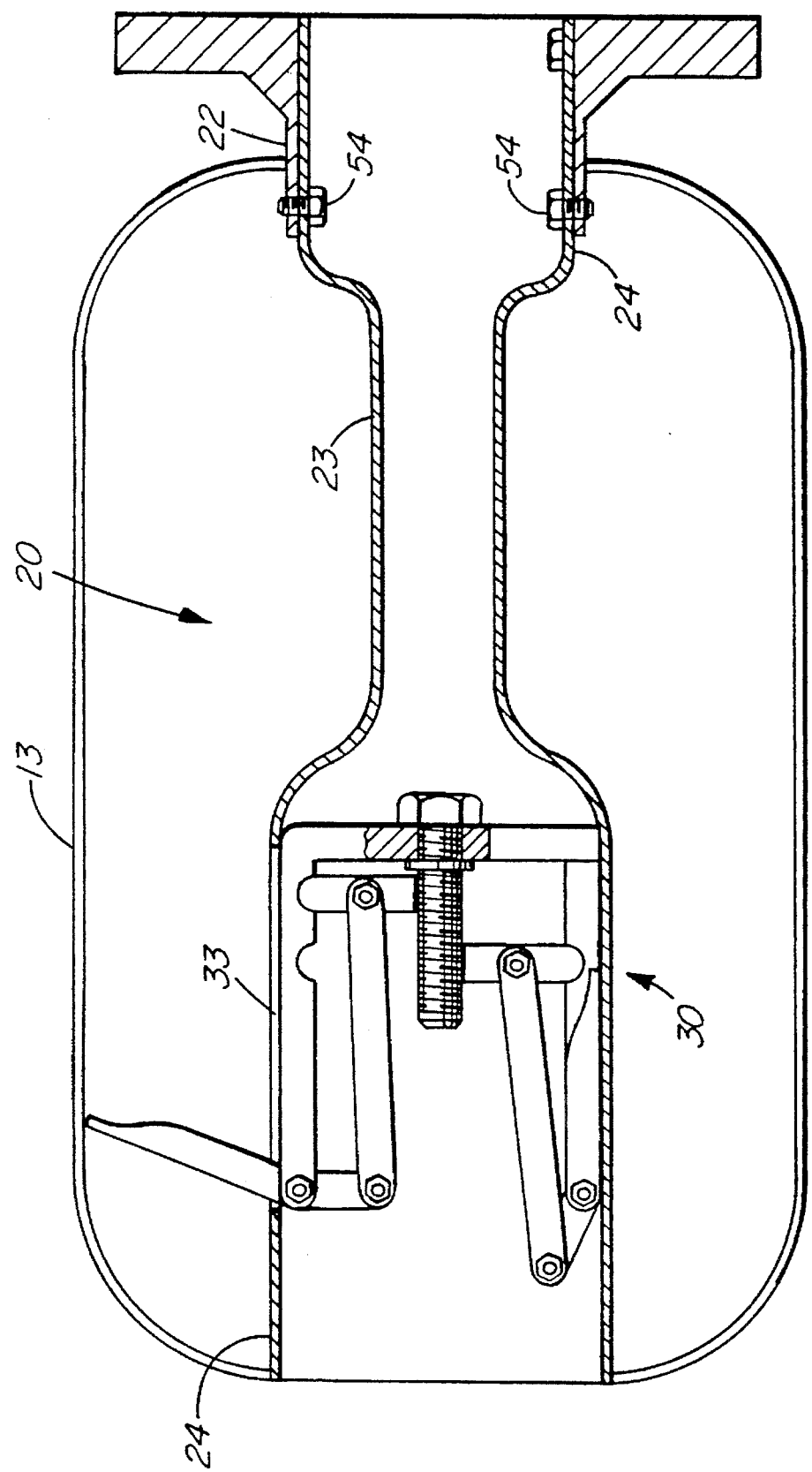
FIG. 2 is a diagrammatic side view of a typical choke tube according to the invention with the support apparatus illustrated in a partially supporting configuration.
Figure 2B:
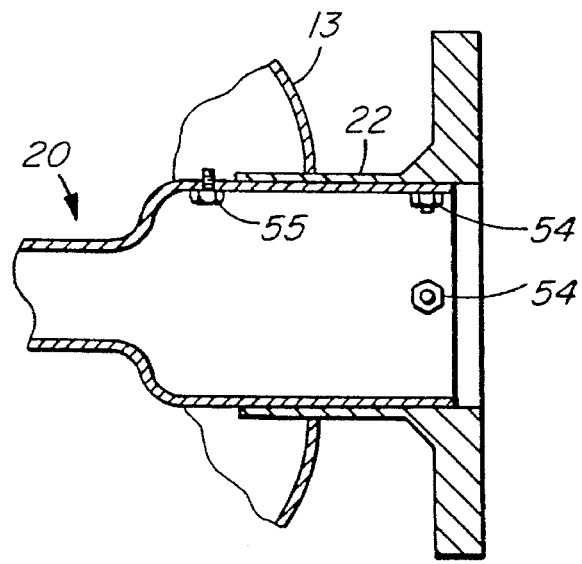

Referring now to FIG. 2, a typical choke tube according to the invention is illustrated generally at 20. It comprises an enlarged first end 21 positioned adjacent the nozzle 22, a central portion 23 of reduced diameter located between the first end 21 and a distant end portion 24 which is used to house the support apparatus generally illustrated at 30. The outside diameters of the first end 21 and the distant end portion 24 are smaller than the inside diameter of the nozzle 22 such that the choke tube 20 can be inserted into the pulsation dampener 13 through the nozzle 22 without removing the nozzle from the pulsation dampener 13 or removing the pulsation dampener 13 from the compressor 10 although under some conditions the pulsation dampener 13 may be conveniently removed to more easily install the choke tube 20.

The distant end portion 24 has three slots 34 located at 120 degree intervals. Each slot 24 is used to allow the extension and retraction of the support arms 40 as will be described in greater detail hereafter. Each slot 24 conveniently has a width of 1 inch and a length which is dependent on the inside diameter of the bottle 13 in which the support apparatus 30 is installed.

Figure 3A:
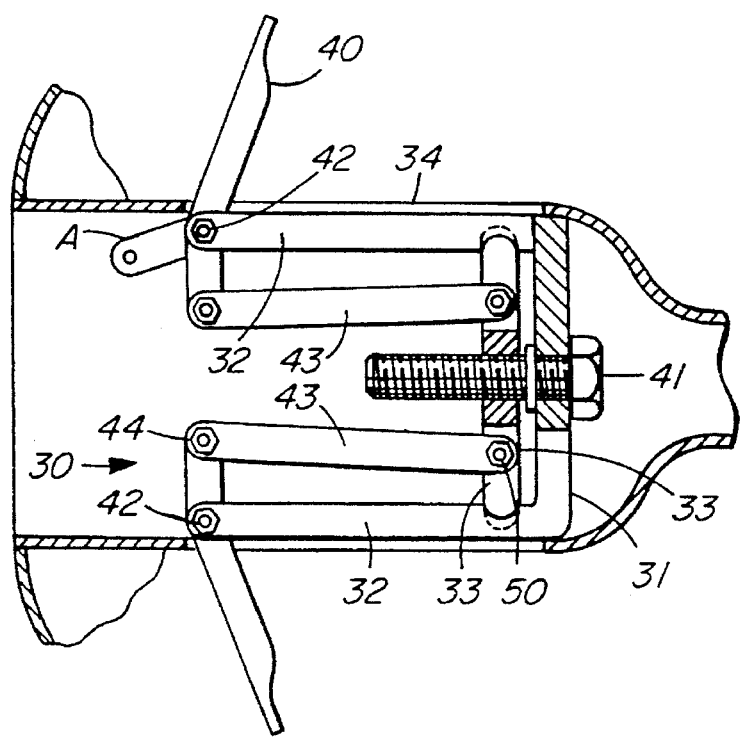
FIG. 3A is an enlarged diagrammatic side view of the support apparatus within the choke tube, the support apparatus being in its support configuration between the choke tube and the pulsation dampener or bottle.
Figure 3B:
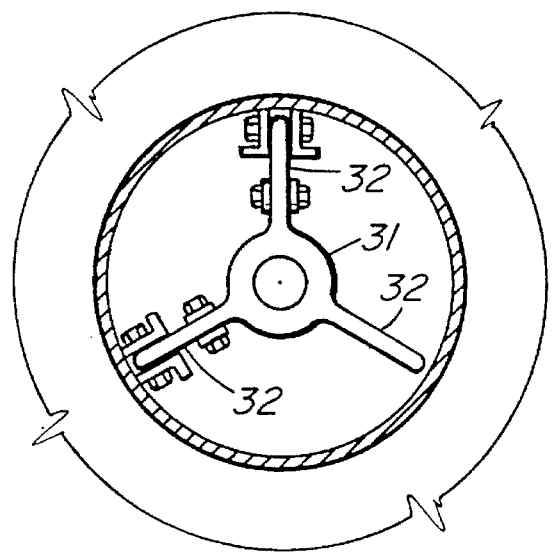
FIGS. 3B and 3C are end diagrammatic views of the support apparatus of FIG. 3A illustrating the attachment of the connecting links to the yoke and the movable collar, respectively.
Figure 3C:
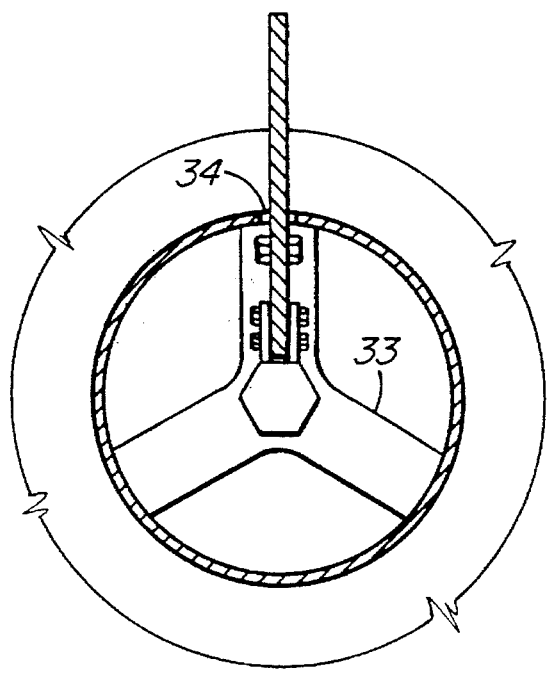

The support apparatus 30 is shown in an enlarged form in FIGS. 3A, 3B and 3C. It comprises a yoke 31 which is conveniently welded in a fixed position within the distant or enlarged end portion 24 of the choke tube 20. The yoke 31 has three outwardly and rearwardly extending arms 32 mounted thereto. The arms 32 are located 120 degrees apart as clearly seen in FIG. 3B.

A movable collar 33 is mounted for reciprocal movement on the yoke 30. It is threadedly engaged with a bolt 41 which is rotatable relative to the yoke 31 and which extends through the yoke 31 to the collar 33.

Three support arms 40, one for each longitudinally extending arm of yoke 41, are mounted on the arms 32 about bolts 42. Bolts 42 allow pivotable movement of the support arms 40.

Three links 43, one for each of the support arms 40, are mounted for pivotable movement between the end of each support arm 40 and the movable collar 33. Respective bolts 44, 50 are provided for the ends of links 43 and allow such pivotable movement.

OPERATION

In operation, it will be assumed that the pulsation dampeners 13 have no choke tubes 14 therein and that a recommendation has been made to install such choke tubes 14 so as to reduce the pulsation and vibration associated with the compressor 10.

With reference to FIG. 1, the bolts 51 which join the nozzle flange 52 and the suction pipe flange 53 are removed and the suction pipe 15 together with its flange 53 is removed. An opening then extends through the nozzle flange 53 and the nozzle 22 directly into the pulsation dampener 13.

The support apparatus 30 will have been previously installed in the choke tube 20 as, for example, by welding and the choke tube 20 with the support apparatus 30 installed therein will be inserted into the interior of the pulsation dampener 13 through the opening in nozzle 22. In such position, the bolt 41 will be rotated previously such that the movable collar 33 is in a position a maximum distance from collar 31; that is, in a position where the links 43 have caused support arms 32 to assume the position illustrated at "A" in FIG. 3A within the interior of the choke tube 20 and lying immediately under the slots 34.

Upon assuming complete entry to the pulsation dampener 13, the first end 21 is locked to the nozzle 22 using set screws 54 conveniently mounted at an 120° interval around the inside diameter or choke tube 20 and which extend between the inside of choke tube 20 and the nozzle 22. If desired and particularly in the case of discharge bottles, the choke tube 20 may be further secured to the bottle nozzle 22 by installation of a further bolt 55 (FIG. 2B) located so that the bolt 55 encounters the inside end of the bottle nozzle 22. This will prevent longitudinal movement of the choke tube 20 through the nozzle 22 in the event the set screws 54 are inadvertently loosened. It is also intended to provide some degree of longitudinal movement for the choke tube 20 within the pulsation dampener 13 so that the distant end 24 of the choke tube can firmly contact the opposite end of the pulsation dampener 13, if desired. Such longitudinal movement can be provided by the connection utilising the bolts 54.

A suitable tool is then inserted through the nozzle 22 and the choke tube 20 so as to rotate the bolt 41. As bolt 41 is rotated, the collar 33 moves towards yoke 31 together with links 43. Links 43, in turn, cause the support arms 40 to move outwardly from the longitudinal axis of the choke tube 20 and through the slots 34 until the support arms 40 contact the inside of the pulsation dampener 13 thereby to retain the choke tube 20 within the pulsation dampener 13. Bolt 41 is appropriately tightened to provide the proper retention force between the support arms 40 and the pulsation dampener 13 to provide a secure connection for the choke tube 20 within the pulsation dampener 13.

The operation for the oppositely located bottle 13 proceeds similarly and following installation of the choke tubes 20 in each bottle or pulsation dampener 13, the suction pipe 15 and the suction pipe flange 53 are again connected to the nozzle flange 52 and the unit is returned to operation without the necessity of removing the pulsation dampeners 13 from their field locations.

There are many modifications which may be made in the apparatus without departing from the spirit of the invention. For example, the support apparatus which is particularly described may be modified in many different respects as long as the choke tube 20 can be inserted through the opening in nozzle 22 and, thereafter, be appropriately and securely retained in its operating position within the pulsation dampener.

The particular embodiments described are illustrative of the invention only and should not be taken as limiting its scope. Many further modifications will readily occur to those skilled in the art to which the invention relates without departing from the invention as defined in accordance with the accompanying claims.

What is claimed is:

1. A method of installing a choke tube within the interior of a pulsation dampener adapted for use on a compressor, said method comprising the steps of inserting a choke tube having a predetermined configuration and choke tube supporting apparatus through a nozzle of said pulsation dampener, connecting said choke tube to said nozzle, supporting said choke tube by said choke tube supporting apparatus within said interior of said pulsation dampener and maintaining said predetermined configuration of said choke tube during operation of said compressor.

2. A method of installing a choke tube as in claim 1 wherein said choke tube supporting apparatus is activated following insertion of said choke tube into said interior of said pulsation dampener.

3. A method of installing a choke tube as in claim 2 wherein said choke tube supporting apparatus is activated by extending rotatable arms from a first position within said choke tube to a second position wherein said rotatable arms extend between said choke tube and the inside of said pulsation dampener.

4. A method of installing a choke tube as in claim 3 wherein said rotatable arms are extended by moving a collar to which said rotatable arms are operably connected.

5. A method of installing a choke tube as in claim 4 wherein said collar is moved by rotating a bolt or screw which moves said collar relative to said choke tube.

6. A choke tube apparatus for reducing the pulsation of a compressor comprising a choke tube, means to attach said choke tube to a nozzle of a pulsation dampener within the interior of said pulsation dampener, means for supporting said choke tube within said pulsation dampener and means to allow insertion of said choke tube into the interior of a pulsation dampener through said nozzle.

7. A choke tube apparatus as in claim 6 wherein said means for supporting said choke tube are arms extending between said choke tube and the inside of said pulsation dampener.

8. A choke tube apparatus as in claim 7 wherein said insertion means comprises arms movable between a first position wherein said choke tube may be inserted into said pulsation dampener through said nozzle and a second position wherein said arms extend between said choke tube and the inside of said pulsation dampener.

9. A choke tube apparatus as in claim 8 and further comprising bolt means operable to provide movement to said arms between said first and second positions.

10. A choke tube apparatus as in claim 9 wherein said attachment means comprises bolts extending between said nozzle and said choke tube.

\* \* \* \* \*